United States Patent
Ola et al.

(10) Patent No.: US 8,264,716 B2
(45) Date of Patent: Sep. 11, 2012

(54) RINGTONE, VOICE, AND SOUND NOTIFICATION OF PRINTER STATUS

(75) Inventors: Zheila L. Ola, Pittsburg, CA (US); Arthur E. Alacar, Concord, CA (US); Barry Sia, Concord, CA (US); Tomoyuki Tanaka, Concord, CA (US)

(73) Assignees: KYOCERA Document Solutions Inc., Osaka, Osaka (JP); KYOCERA Document Solutions Development America, Inc., Concord, CA (US)

(*) Notice: Subject to any disclaimer, the term of this patent is extended or adjusted under 35 U.S.C. 154(b) by 1631 days.

(21) Appl. No.: 11/411,675

(22) Filed: Apr. 26, 2006

(65) Prior Publication Data
US 2007/0253005 A1 Nov. 1, 2007

(51) Int. Cl.
*G06F 3/12* (2006.01)
*G06K 9/00* (2006.01)

(52) U.S. Cl. ........ 358/1.15; 358/1.9; 358/1.1; 358/1.11; 358/1.12; 358/1.13; 358/1.14; 358/1.16; 358/1.17; 358/1.18; 358/501; 358/505; 358/524; 358/530; 358/401; 358/402; 358/403; 358/405; 358/409; 358/434; 358/471; 358/296; 382/103; 382/114; 382/115; 382/116; 382/117; 382/120; 382/291; 355/98; 355/31; 379/88.12; 379/88.08; 379/1.02; 379/41; 379/67.1; 379/68; 379/93.28

(58) Field of Classification Search .............. 358/1.1, 358/1.9, 2.1, 1.11–1.18, 501, 505, 524, 530, 358/401–403, 405, 409, 434, 471, 296; 382/103, 382/114–117, 120, 291; 355/98, 31
See application file for complete search history.

(56) References Cited

U.S. PATENT DOCUMENTS

| | | | | |
|---|---|---|---|---|
| 6,850,337 B1 * | 2/2005 | Anderson et al. | ............ | 358/1.15 |
| 6,934,915 B2 | 8/2005 | Rudd | | |
| 7,057,752 B1 * | 6/2006 | Klotz, Jr. | ............ | 358/1.15 |
| 7,193,688 B2 * | 3/2007 | Takamine et al. | ............ | 355/98 |
| 7,532,355 B2 * | 5/2009 | Gauthier et al. | ............ | 358/1.18 |
| 7,630,092 B1 * | 12/2009 | Suzuki et al. | ............ | 358/1.14 |
| 2003/0025935 A1 | 2/2003 | Somei | | |
| 2003/0048469 A1 * | 3/2003 | Hanson | ............ | 358/1.14 |
| 2004/0176031 A1 | 9/2004 | Haller | | |
| 2004/0203368 A1 | 10/2004 | Haller | | |
| 2005/0104910 A1 | 5/2005 | Lapstun | | |
| 2005/0258938 A1 * | 11/2005 | Moulson | ............ | 340/7.58 |

FOREIGN PATENT DOCUMENTS
JP 2000343762 12/2000
JP 2002358188 12/2002

* cited by examiner

*Primary Examiner* — Steven Kau

(57) ABSTRACT

A method for ringtone, voice, and sound notification of printer status, comprising obtaining status information of a printer, converting it into an audible report, and delivering the audible report. The method is especially useful for visually-impaired users and for shared printers in crowded situations where it is difficult for each user to see the panel or monitor display. The methods also include detection by the events controller, UI manager instructing an audio manager, codec decoding an audio file in firmware and hardware organization; job owner identification information embedded into a print job with a unique tag; user identification sound data embedded in a print job; audible report for multiple jobs in a job queue, with positional information; text-to-speech conversion; unique ringtone melody for each user, comprising department prefix, higher pitch modulation for higher priority, and automatically converting an alphanumeric character into the corresponding note.

18 Claims, 7 Drawing Sheets

| 210 | Obtain printer (MFP) status information data |
|---|---|
| | (Retrieve embedded job owner information from the print job) |

| 220 | Convert printer status information data into an audible report. |
|---|---|

| 230 | Convert User ID information into a voice report, or into a unique melody |
|---|---|
| | (The unique melody may be user-specified or automatically-generated.) |

| 240 | Notify user by delivering the audible report generated by printer firmware and hardware |
|---|---|

FIG. 2

510 Print job queue

| Job# | Job owner | #Copies | Status |
|---|---|---|---|
| 145 | Zheila | 10 | Printing |
| 148 | Barry | 2 | Queued |
| 151 | Art | 1 | Queued |
| 160 | Tom | 5 | Queued |
| . . . . | | | |

520 Audible report for the print job queue

"  Now printing a job by Zheila.
   The second item in the queue is a job by Barry.
   The third item in the queue is a job by Art.
   The fourth item in the queue is a job by Tom.
         "
   . . .

FIG. 5

610  Converting user ID information into ringtone melody
         unique to each user User name:  Abaca Possible conversions 1:  melody specified by the user 2:  melody consisting of notes,  A B A C A
        (The letter C corresponds to the note "middle C")

3:  melody consisting of notes,  C D C E C
        (The letter A corresponds to the note "middle C")

Optionally shorten length of a note by 20% if the note is higher in pitch than the preceding note,  and lengthen the note by 20% if the note is lower in pitch than the preceding note.

FIG. 6

710 Embedding as comments in Print stream

<<< PDL stream >>> using PS comment for KPDL :
    %%For: Michael (or %%UserName: Michael)\ using PJL comment for KPDL/PCL :
    @PJL COMMENT UserName: Michael

<<< PDL stream >>>

---

720 Embedding as PJL Username in Print stream

@PJL SET USERNAME = "Michael"

---

730 Embedding binary files in Print stream

@PJL FSDOWNLOAD FORMAT:BINARY
    ~NAME = "0:\pcl\macros\Name: Macroname;
    ~Application; ABC; Manufacturer: XYZ;
    ~Version: 7.9; Date:12/30/2006" SIZE = 42<CR><LF>
    42 bytes of macro data<ESC>%-12345X

FIG. 7

RINGTONE, VOICE, AND SOUND NOTIFICATION OF PRINTER STATUS

FIELD OF THE INVENTION

This invention relates to printers, and more particularly to ringtone, voice, and sound notification of printer status.

BACKGROUND OF THE INVENTION

When a printer is shared among multiple users, there may be confusion as the ownership of a printout produced by the printer. A panel display mounted on a printer may sometimes show some information about the job and the job queue status, but such a panel display is limited in size and the job owner information is often unavailable to the printer at all. A more user-friendly method of notification for job owner and other printer status is desired, especially for visually impaired persons or for those crowded situations where it is inconvenient for each user to come up closely to the panel display of the printer. Existing systems have not adequately addressed these perceived needs and concerns. The present invention arose out of the above concerns associated with providing better methods for notifying users of printer status.

SUMMARY OF THE INVENTION

Methods, computer program products, computing and printing systems for ringtone, voice, and sound notification of printer status are described. The methods comprise obtaining status information of a printer, converting it into an audible report, and delivering the audible report. The method is especially useful for visually-impaired users and for shared printers in crowded situations where it is difficult for each user to see the panel or monitor display.

In an embodiment of the present invention, the methods also include detection by the events controller, UI manager instructing an audio manager, codec decoding an audio file, and generally firmware and hardware organization for accomplishing configuring, registering, storing, downloading, and actual sound generation of sound-related data.

In a further embodiment of the present invention, job owner identification information is embedded into a print job with a unique tag, so that this information is available to the printer. The actual user identification sound data can also be embedded in a print job. The foregoing information can be used to notify user of job owner information of the job being processed.

In a further embodiment of the present invention, audible report is generated for multiple jobs in a job queue, with positional information, which allows the users of upcoming jobs to be alerted. This is especially useful for university computer rooms and other shared-printer environment. Text-to-speech conversion is used to produce voiced speech reports.

In a further embodiment of the present invention, audible report generated for a print job or other aspects of printer status is a unique ringtone melody for each user, comprising department prefix, higher pitch modulation for higher priority, and automatically converting an alphanumeric character into the corresponding note. Use of ringtone melody typically requires less complex hardware and software, shorter in duration, possibly more robust in a noisy environment, and less distracting than voiced speech reports.

The invention will be more fully understood upon consideration of the detailed description below, taken together with the accompanying drawings.

DESCRIPTION OF THE DRAWINGS

FIG. 2 is a flowchart showing the overall processing for sound notification of printer status, in accordance with a preferred embodiment of the present invention.

FIG. 5 is an illustration of an auditory report for multiple print jobs in a print job queue, in accordance with a preferred embodiment of the present invention.

FIG. 6 is an illustration of conversion methods from a user name to ringtone melodies, in accordance with a preferred embodiment of the present invention.

FIG. 7 is a diagram illustrating methods for embedding job owner information into a print stream, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
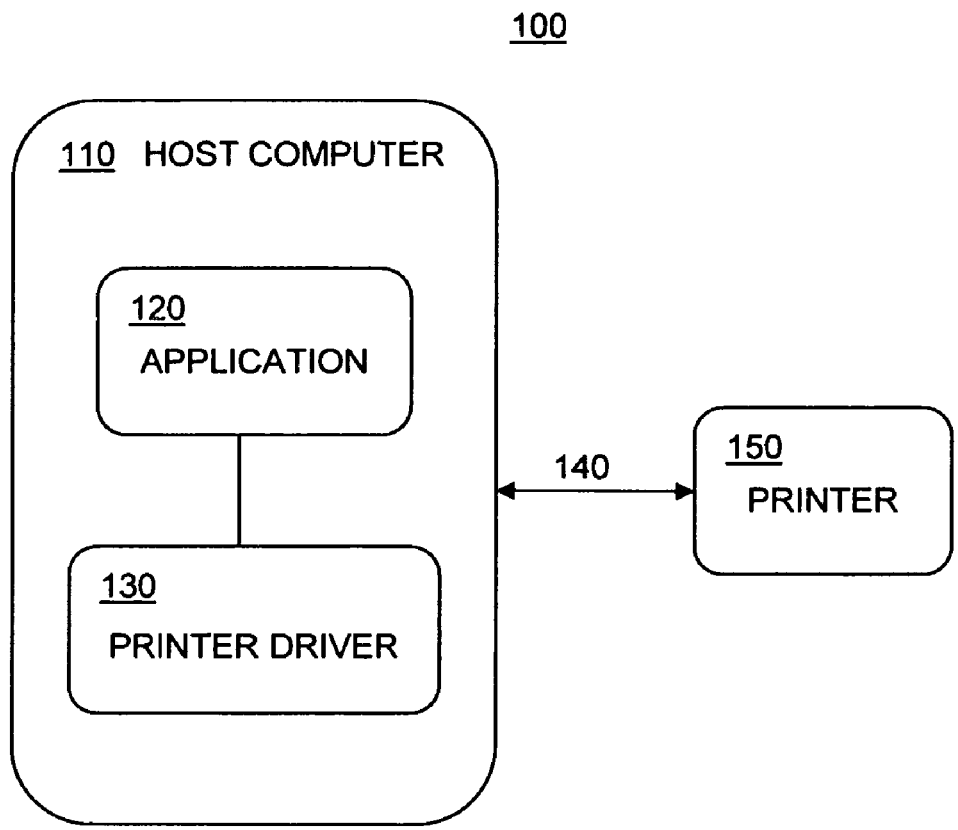
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

FIG. 2 is a flowchart showing the overall processing for sound notification of printer status, in accordance with a preferred embodiment of the present invention.

In step 210, printer status information data is obtained. Such status information may include amount of paper left, amount of toner or ink left, amount of time elapsed since the last maintenance, etc. The status information may also include printer status for anomalous conditions, like paper-jam, out of paper, out of toner or ink, cover open, network connection anomaly, etc.

Especially useful printer status information that may be of interest to the users of the printer is the job owner of the print job being processed and each job in the print queue. Where this information is not already available to the printer, before it can be retrieved by a printer, it must first be specifically inserted into a print job. The methods of embedding job owner information into a print job are described below.

In step 220, the obtained printer status information data is converted into an audible report. Such audible report may be voiced speech using text-to-speech conversion, and may also use a ringtone melody in a MIDI or similar format. Various forms of audible report for expected range of printer status conditions can be preset as factory default, which can later be customized by the user.

In step 230, user identification (or print job owner) information of the printer status is converted into a voice report, or into a unique melody. As described below, this melody should be unique to each user, which may be user-specified or automatically-generated.

In step 240, by delivering the audible report the user is notified of the printer status. Delivering of this audible report is typically accomplished by producing a sound from a speaker mounted on the printer itself, but other positions for the speaker closer to the user to be notified are also possible. The details of this step will be described shortly.

Figure 3:
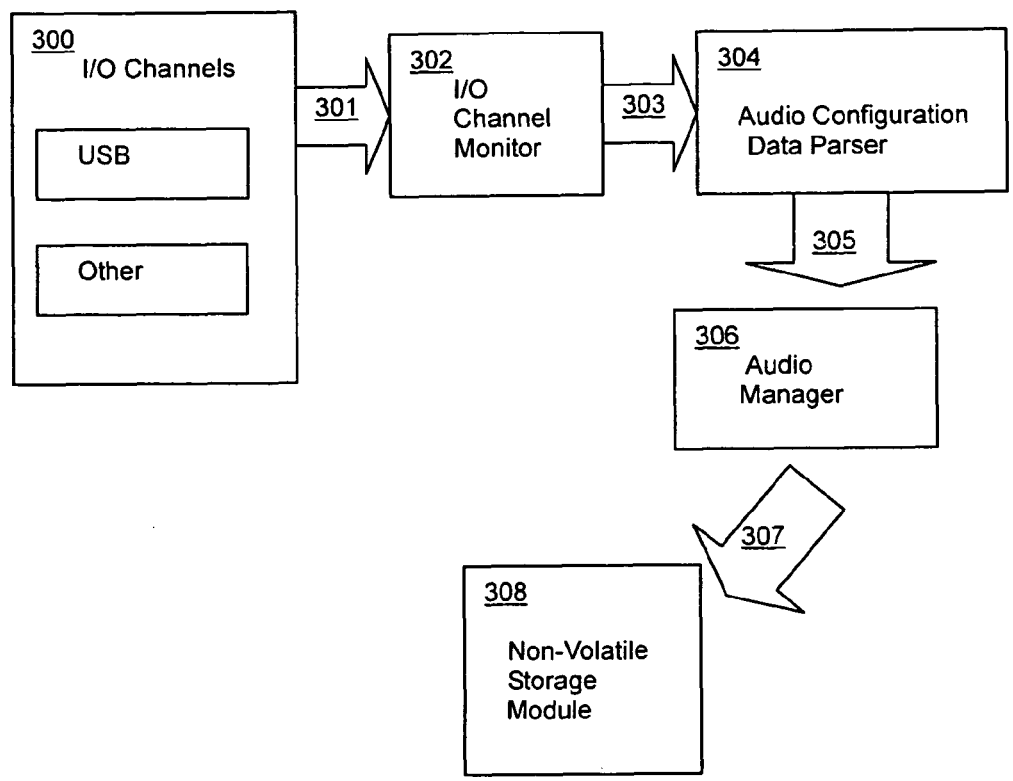
FIG. 3 is a simplified block diagram illustrating configuration and registration of sound reports, in accordance with a preferred embodiment of the present invention.

FIG. 3 is a simplified block diagram illustrating configuration and registration of sound reports, in accordance with a preferred embodiment of the present invention.

Audio Configuration Data and the Audio File Data 301 is received from any of a variety of possible I/O Channels 300. First few bytes of the Audio Configuration Data 301 are checked by the I/O Channel Monitor 302, which identifies the data type. If the data type is found to be print job type, then the rest of the data is processed as print job data. If the data type is found to be Audio Configuration Data, the rest of the data 303 is passed to the Audio Configuration Data Parser 304. The data 303 is sent the Audio Configuration Data Parser 304 for processing.

The Audio Configuration Data Parser 304 parses incoming data and invokes the appropriate functions of the Audio Manager 306. Audio Configuration Data Parser calls Audio Manager functions. Audio Manager 306 generates an Audio Data Block containing the Audio File along with various configuration information 307. The Audio Data Block 307 is passed to Non-Volatile RAM Storage Module 308.

Non-Volatile Storage Module 308 stores the Audio Data Block into non-volatile medium. Non-Volatile medium could be any of a variety of storage devices that can store data indefinitely regardless of power availability like SD/CompactFlash Cards, FlashROM, Hard Disk Drive, etc.

Figure 4:
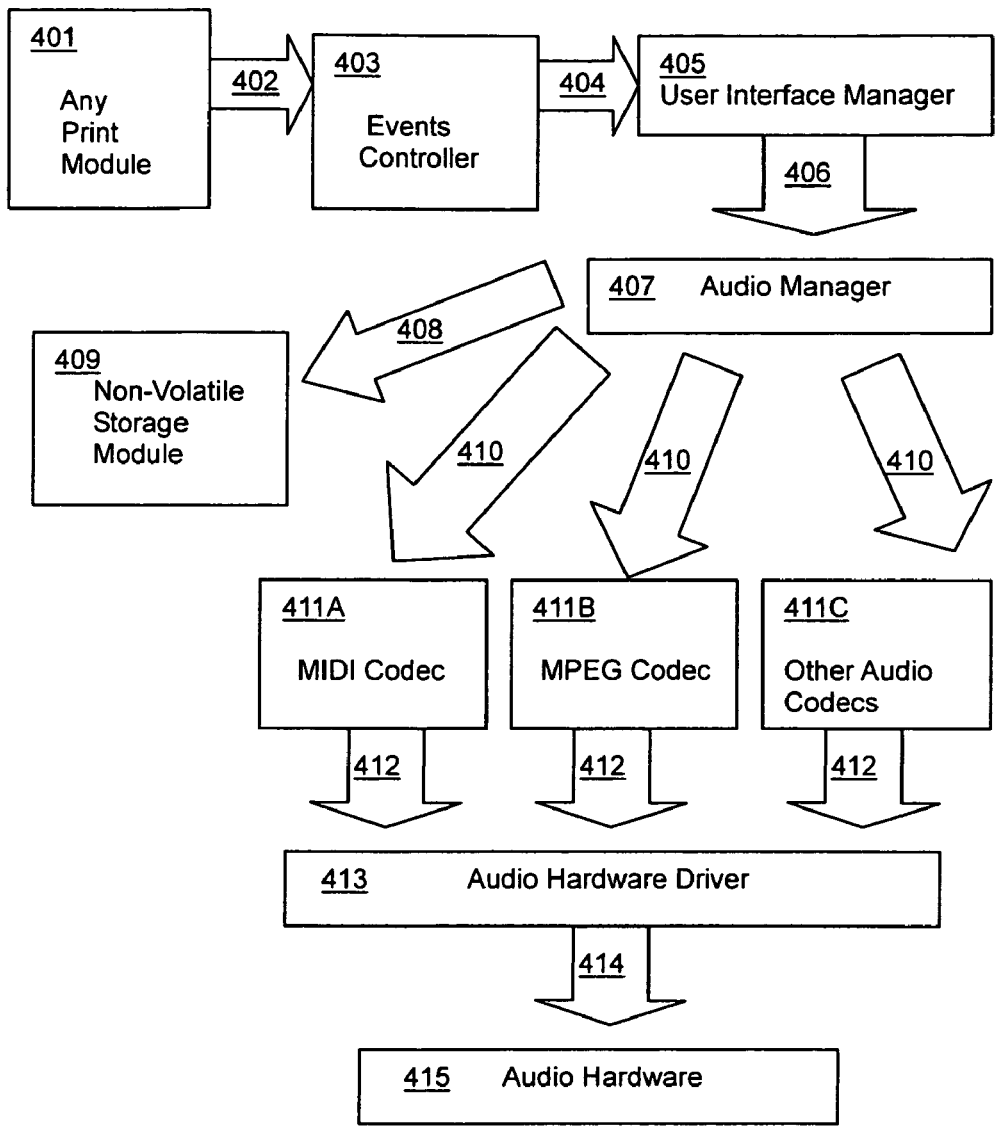
FIG. 4 is a simplified block diagram illustrating audio decoding and generation of sound reports, in accordance with a preferred embodiment of the present invention.

FIG. 4 is a simplified block diagram illustrating audio decoding and generation of sound reports, in accordance with a preferred embodiment of the present invention.

Any of a variety of print modules 401 detects an event. A print module can be any component of the printing system. For example, Print Engine Controller, PCL Parser, etc. An event can be any event from the cover being opened by the user to a page being purged from the printer. The print module that detects the event generates an Event Data Block 402 containing information about the event. The Print Manager sends the Event Data Block 402 to the events controller for filtering.

The Events Controller 403 filters events and routes them to the appropriate printing system component for processing. The Events Controller passes the Event Data Block 404 to the User Interface Manager 405.

The User Interface Manager 405 determines what actions need to be taken to inform the user of any print-related event based on the Event Data Block. When one of these actions is to generate an audio prompt or signal, the User Interface Manager informs the Audio Manager to perform some action 406.

The Audio Manager 407, as instructed by the User Interface Manager, retrieves the Audio Data Block from the corresponding File Data Block handle to be issued by the Non-Volatile Storage Module. Note that the actual Audio File data is not yet downloaded at this point.

Retrieving 408 of the File Data Block could be done via a function call to the Non-Volatile Storage Module 409. The Non-Volatile Storage Module 409 generates a File Data Block containing various information about the Audio Data Block.

The Audio Manager reads from the File Data Block the related configuration information in the Audio Data Block and interprets them and passes the File Data Block 410 to the appropriate Audio Codec with instructions on how to generate the audio. There could be several Audio Codecs supported by the system: MIDI Codec 411A, Mpeg Codec 411B, and other Audio Codecs 411C. Each Codec decodes the audio file—using the File Data Block to retrieve the Audio File from the Non-Volatile Storage—and calls the necessary functions in the Audio Hardware Driver.

An Audio Codec invokes 412 the appropriate functions in the Audio Hardware Driver to generate the Audio. The Audio Hardware Driver 413 directly accesses the Audio Hardware. The Audio Hardware Driver 413 controls the Audio Hardware by programming a set of hardware registers. The Audio Hardware 415 generates sound as programmed in its registers.

FIG. 5 is an illustration of an auditory report for multiple print jobs in a print job queue, in accordance with a preferred embodiment of the present invention. In this example, the first four jobs in the Print job queue 510 as shown in FIG. 5. The job number, Job owner, Number of copies to be printed, and the Status of each job are shown 510. The first job is currently printing, and the subsequent jobs are queued and waiting to be processed.

For these jobs in the print job queue, the following audible report may be produced and used: "Now printing a job by Zheila. The second item in the queue is a job by Barry. The third item in the queue is a job by Art. The fourth item in the queue is a job by Tom." 520. Additional information can be included in the audible report. Note that this assumes use of a text-to-speech conversion and voice notification. As described later, a ringtone may also be used to identify the job owner in this type of audible report for the print job queue.

The foregoing arrangement for reporting printer job status would be especially useful in a Printer Server Configuration, for example, in a university computer terminal room with a separate printer room. In printer-server configuration, a printer is installed locally in a PC (Server PC). This printer is then shared by changing the Sharing Printer Properties and specifying a shared name for this printer. All other PCs (client PC1 and PC2) connected on the same network domain as the Server PC can access the shared printer by browsing through all printers available in the network and choosing the specific shared printer name during installation in each PC. During printing, all print jobs generated from client PCs (PC1 and PC2) will be queued and processed one by one in the print server.

Typically, a university printer room is near or adjacent to one or more computer terminal room(s). The printer room houses a high-output printer connected to a printer server computer, which shows a display of the print job queue. When many users are waiting for their printouts, it would be beneficial to provide an auditory report of the print job queue, in addition to the visual display of the job queue on the computer display. A continuous reporting of printer job status would be too noisy and undesirable for a quiet office environment, but would be helpful in such a printer room.

FIG. 6 is an illustration of conversion methods from a user name to ringtone melodies, in accordance with a preferred embodiment of the present invention. User ID information is converted into a ringtone melody that is unique to each user 610.

In this example, the user name is "Abaca" which typically is the user's family name. There are several possible conversion methods. The first conversion method is to designate for the user a unique ringtone melody specified by the user. Where this is too cumbersome to implement or if there is no personalized melody specified by or for the user, the following automatic conversion methods can be used.

The letters in the user name "Abaca" can be converted into a melody consisting of notes, A-B-A-C-A, wherein the letter C corresponds to the note "middle C." The subsequent letters in the alphabet D, E, F, etc. are similar converted into the corresponding notes. Similarly, the user name "Abaca" can be converted into a melody consisting of notes, C-D-C-E-C, wherein the letter A corresponds to the note "middle C."

The resulting melody may sound totally random to the user at first, but the user would begin to recognize the melody after hearing it several times. It is also possible to give the melody a syncopated rhythm according to some rule. A possible rule may be to shorten the length of a note by 20% if the note is higher in pitch than the preceding note, and lengthen the note by 20% if the note is lower in pitch than the preceding note. Such a transformation would help to give more character to the melody, and make it easier to remember. This rule may be somewhat arbitrary, but it also needs to be deterministic so that the resulting melody for a user is consistent.

FIG. 7 is a diagram illustrating methods for embedding job owner information into a print stream, in accordance with a preferred embodiment of the present invention.

Where the job owner information is not already present in the structure of a print job, it needs to be attached, inserted, or embedded into a print job, in order for that information to be available to the system producing a notification report. Such information embedded into a print stream using a certain format can later be retrieved using the same format.

When a document is printed using a printer driver, the application typically calls the driver using standard printing and drawing GDI API functions. The driver processes these calls first in its core portion which handles operating system specifics, and then depending on the type of printer driver, control is passed either to a selected PDL (Page Description Language or Printer Description Language) module or to a rendering module. While the rendering module produces a raster bitmap for each printed page of the document, the PDL module converts the drawing API function calls into PDL commands which the printer can understand.

The sequence of calls which the PDL module receives for an n-page document is as follows:
StartDoc( )
StartPage( ), page 1<Drawing functions for each print object>EndPage( ), page 1
. . .
StartPage( ), page n<Drawing functions for each print object>EndPage( ), page n
EndDoc( ).

After the PDL module converts the drawing API function calls into PDL commands which the printer can understand, the result is a print stream comprising commands of the PDL (PCL 5C, PCL XL, PostScript, KPDL, PRESCRIBE, etc.). After a print stream is produced, it is the job of the print spooler to send the print stream (or related files) to a printer. When the spooler completes sending the print stream to the printer, the spooler deletes the temporary file(s) holding the output.

One possible method is to embed the job owner information as a comment in a print stream 710. Inserted into a PDL stream or print stream is a comment-line that is skipped and ignored by the PDL processor. Using a PostScript comment format for KPDL, such a line may be "%% For: Michael (or %% UserName: Michael)" as in the example 710. Using a PJL comment format for KPDL/PCL, such a line may be "@PJL COMMENT UserName: Michael" as in the example 710. The unique tag "UserName" is used during the process of retrieving the corresponding information.

Another possible method is to use the PJL USERNAME format 720. Using this format, the line "@PJL SET USERNAME="Michael"" maybe inserted into the print stream 720. Here the unique tag used is "USERNAME" in the line.

Another possible method is to embed a binary file into a print stream 730. This binary file may be a MIDI file or raw sound file for audible report. Embedding a binary file into a print stream can be achieved in a manner similar to downloading a macro to a printer using PJL. Five lines starting with "@PJL FSDOWNLOAD FORMAT:BINARY" achieve this operation 730.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for notifying a printer status, comprising
upon a print module detecting an event, the print module generating an event data block containing information about the event, which event data block is sent by an events controller to a user interface manager;
upon determination by the user interface manager to generate an audible report for the event based on the event data block containing information about the event, the user interface manager causes an action by an audio manager of obtaining at least one status information data of a printer, which at least one status information data comprising user identification information of at least one print job processed by the printer, which user identification information comprising job owner information associated with the at least one print job;
converting, using a microprocessor, the at least one status information data into an audible report comprising a unique ringtone melody, wherein each note in the ringtone melody is determined based on the user identification information comprising job owner information; and
notifying a user by delivering the audible report.

2. The method of claim 1, wherein obtaining of the at least one status information data of a printer comprises detection by the events controller of the printer; and wherein converting of the at least one status information data into an audible report and notifying a user by delivering the audible report comprises a user interface manager of the printer instructing an audio manager of the printer to generate an audio signal and a codec decoding an audio file.

3. The method of claim 1, wherein the user identification information of the at least one print job processed by the printer comprises job owner information embedded in the at least one print job as at least one PDL comment comprising a unique tag.

4. The method of claim 1, wherein the user identification information of the at least one print job processed by the printer comprises sound data corresponding to the user identification information embedded in the at least one print job.

5. The method of claim 1, wherein the user identification information of the at least one print job processed by the printer comprises the audible report comprising the user identification information of at least two print job in a print job queue scheduled to be processed most immediately, each print job optionally accompanied by positional information within the print job queue.

6. The method of claim 1, wherein the audible report comprises a speech voice report converted using text-to-speech conversion from the user identification information of the at least one print job processed by the printer.

7. The method of claim 1, wherein the audible report comprises a unique ringtone melody corresponding to the user identification information and optionally at least one other print job status information data of the at least one print job processed by the printer.

8. The method of claim 7, wherein the ringtone melody comprises department identification prefix, higher pitch modulation for higher priority job processing, and a ringtone produced by converting an alphanumeric character into a note assigned to the alphanumeric character, optionally with uniform tone-raising conversion and automatic syncopated-rhythm conversion for greater memorability.

9. A non-transitory computer-readable storage medium with an executable program stored thereon, wherein the program instructs a microprocessor to perform the method steps of:
upon a print module detecting an event, the print module generating an event data block containing information about the event, which event data block is sent by an events controller to a user interface manager;
upon determination by the user interface manager to generate an audible report for the event based on the event data block containing information about the event, the user interface manager causes an action by an audio manager of obtaining at least one status information data of a printer, which at least one status information data comprising user identification information of at least one print job processed by the printer, which user identification information comprising job owner information associated with the at least one print job;
converting the at least one status information data into an audible report comprising a unique ringtone melody, wherein each note in the ringtone melody is determined based on the user identification information comprising job owner information; and
notifying a user by delivering the audible report.

10. The computer program product of claim 9, wherein obtaining of the at least one status information data of a printer comprises detection by the events controller of the printer; and wherein converting of the at least one status information data into an audible report and notifying a user by delivering the audible report comprises a user interface manager of the printer instructing an audio manager of the printer to generate an audio signal and a codec decoding an audio file.

11. The computer program product of claim 9, wherein the user identification information of the at least one print job processed by the printer comprises job owner information embedded in the at least one print job as at least one PDL comment comprising a unique tag; and wherein the user identification information of the at least one print job processed by the printer comprises sound data corresponding to the user identification information embedded in the at least one print job.

12. The computer program product of claim 9, wherein the user identification information of the at least one print job processed by the printer comprises the audible report comprising the user identification information of at least two print job in a print job queue scheduled to be processed most immediately, each print job optionally accompanied by positional information within the print job queue; and wherein the audible report comprises a speech voice report converted using text-to-speech conversion from the user identification information of the at least one print job processed by the printer.

13. The computer program product of claim 9, wherein the audible report comprises a unique ringtone melody corresponding to the user identification information and optionally at least one other print job status information data of the at least one print job processed by the printer;

and wherein the ringtone melody comprises department identification prefix, higher pitch modulation for higher priority job processing, and a ringtone produced by converting an alphanumeric character into a note assigned to the alphanumeric character, optionally with uniform tone-raising conversion and automatic syncopated-rhythm conversion for greater memorability.

14. A computing system for notifying a printer status, comprising:
a printer comprising a print engine;
a computer connected to the printer, comprising a memory having instructions for:
upon a print module detecting an event, the print module generating an event data block containing information about the event, which event data block is sent by an events controller to a user interface manager;
upon determination by the user interface manager to generate an audible report for the event based on the event data block containing information about the event, the user interface manager causes an action by an audio manager of obtaining at least one status information data of a printer, which at least one status information data comprising user identification information of at least one print job processed by the printer, which user identification information comprising job owner information associated with the at least one print job;
converting the at least one status information data into an audible report comprising a unique ringtone melody, wherein each note in the ringtone melody is determined based on the user identification information comprising job owner information; and
notifying a user by delivering the audible report;
and a processor for executing the instructions.

15. The computing system of claim 14, wherein obtaining of the at least one status information data of a printer comprises detection by the events controller of the printer; and wherein converting of the at least one status information data into an audible report and notifying a user by delivering the audible report comprises a user interface manager of the printer instructing an audio manager of the printer to generate an audio signal and a codec decoding an audio file.

16. The computing system of claim 14, wherein the user identification information of the at least one print job processed by the printer comprises job owner information embedded in the at least one print job as at least one PDL comment comprising a unique tag; and wherein the user identification information of the at least one print job processed by the printer comprises sound data corresponding to the user identification information embedded in the at least one print job.

17. The computing system of claim 14, wherein the user identification information of the at least one print job processed by the printer comprises the audible report comprising the user identification information of at least two print job in a print job queue scheduled to be processed most immediately, each print job optionally accompanied by positional information within the print job queue; and wherein the audible report comprises a speech voice report converted using text-to-speech conversion from the user identification information of the at least one print job processed by the printer.

18. The computing system of claim 14, wherein the audible report comprises a unique ringtone melody corresponding to the user identification information and optionally at least one other print job status information data of the at least one print job processed by the printer;

and wherein the ringtone melody comprises department identification prefix, higher pitch modulation for higher priority job processing, and a ringtone produced by converting an alphanumeric character into a note assigned to the alphanumeric character, optionally with uniform tone-raising conversion and automatic syncopated-rhythm conversion for greater memorability.

* * * * *